United States Patent Office 2,705,233
Patented Mar. 29, 1955

2,705,233

16,17-OXIDO-PREGNANE-3α-OL-3,20-DIONE

Percy L. Julian, Maywood, Ill., assignor to The Glidden Company, Cleveland, Ohio, a corporation of Ohio No Drawing. Application May 29, 1950,
Serial No. 165,120

1 Claim. (Cl. 260—239.55)

The present invention relates to the preferential epoxidation of 20-keto-16-pregnenes.

Of the numerous steroids obtained from the adrenal cortex, those which possess a 17α-hydroxy-20-keto structure are of special interest because of their proven or possible value in the treatment of rheumatoid arthritis and other disorders. Among these may be mentioned Kendall's Compound E (Cortisone), Reichstein's Compound S, 17α-hydroxy-progesterone, and 17-hydroxy-corticosterone. Others, such as Δ⁵-pregnene-3β,17α,21-triol-20-one, are also of interest.

Since the supply of those naturally-occurring 17α-hydroxy steroids is limited, their partial synthesis from sterols, bile acids and genins is being studied in many laboratories. One of the proposed methods involves the preparation of 16-dehydro-20-keto compounds, which are then converted to 17α-hydroxy compounds via 16,17-epoxides.

It is known that these epoxides can be made by treatment with perbenzoic acid. But where there are double bonds elsewhere in the ring, such as at the 5-6 position, epoxidation also takes place there. Also, the formation of lactones occurs in such compounds as the 3-keto steroids as reported by Burckhardt and Reichstein, Helv. 25, 1434 (1942). These authors, however, state unequivocably that "3α-acetoxy-12-keto-cholanic acid does not react with perbenzoic acid under the conditions employed." Moreover, Sarett, J. A. C. S. 69, 2899 (1947), reported a yield of 85% of 17-acetoxy-11-keto-3-acetoxy-etiocholane by the oxidation of 3-acetoxy-11,20-diketo pregnane with perbenzoic acid. The results of Sarett and of Burckhardt and Reichstein would suggest that no lactone formation took place involving 11-keto or 12-keto groups, in contradistinction to lactone or ester formation where keto groups are elsewhere in the molecule.

In small quantity reactions and in some solvents such as benzene, the quantity of lactone formed might go unnoticed or be negligible. However, in large scale commercial operations, these 11-keto and 12-keto compounds yield appreciable quantities of lactone, possibly because of the increased time element involved. Thus in the perbenzoic acid oxidation of the 3-acetoxy-11,20-diketo-16-pregnene I, there was obtained about 40% of the oxide II. About 25-30% of the lactone III is formed and the remaining material is an oil. The oxide II, however, is very difficult to purify and the yield, of course, leaves much to be desired.

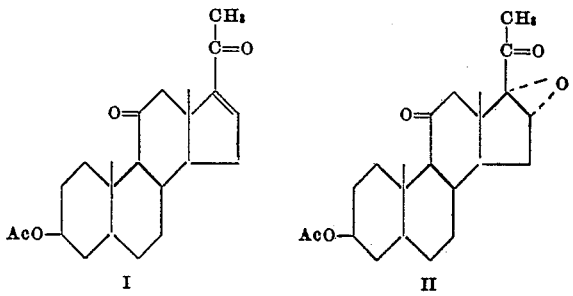

It is accordingly an object of the present invention to provide an improved process for preparing 16,17-oxido-20-keto steroids of the pregnane series.

A further object is to provide an improved process for preparing 16,17-oxido-20-keto pregnenes from pregnadienes.

Another object of the invention is to provide a process for preparing 16,17-oxido-20-keto compounds of the pregnane series from Δ¹⁶-20-keto compounds of the pregnane series without attack at any points of isolated unsaturation.

An additional object is to provide a process for preparing 16,17-oxido-20-keto steroids of the pregnane series which also possess keto groups in the 11- or 12-positions.

Still another object is to provide a preferential epoxidation procedure for 20-keto-16-pregnadienes.

Still a further object is to provide novel intermediates in the preparation of 17α-hydroxy steroids.

Other objects will be apparent from the following description.

It has been found that the foregoing objects can be accomplished by treatment of the 20-keto-16-pregnene compounds with hydrogen peroxide in alkaline solution. The reaction results in substantially quantitative formation of the 16,17-oxido compounds without attack at other double bonds not conjugated with a keto group and without formation of lactones from cyclic ketones. Thus, upon treatment of 16-pregnene-ol-3-one-20 acetate, a quantitative yield of 16,17-oxido-pregnane-ol-3β-one-20 was obtained. Treatment of 5,16-pregnadiene-ol-3β-one-20 acetate similarly results in substantially a quantitative yield of 16,17-oxido-5-pregnene-ol-3β-one-20. Treatment of 16-pregnene-3α-ol-11,20-dione acetate led to an almost quantitative yield of 16,17-oxido-pregnane-3α-ol-11,20-dione. Treatment of 9(11),16-pregnadiene-3α,11-diol-20-one 3,11-diacetate yields 16,17-oxido-pregnane-3α-ol-11,20-dione. Treatment of Δ⁵,¹⁶-pregnadiene-3β-acetoxy-12,20-dione, obtainable from botogenin, yields 16,17-oxido-3β-hydroxy-12,20-diketo-5-pregnene.

The following examples are illustrative of conditions for practicing the invention.

Example 1

*16,17-oxido-5-pregnene-3β-ol-20-one from 5,16-pregnadiene-3β-ol-20-one acetate.*—A solution of 3.0 g. of 5,16-pregnadiene-3β-ol-20-one acetate in 200 cc. of methanol was treated at 15° C. with 6 cc. of 4 N. sodium hydroxide solution and 12 cc. of 30% hydrogen peroxide. This solution was allowed to stand for 24 hours at 2° C. It was then concentrated in vacuo to about 50 cc. and diluted with 500 cc. of water. The fine crystalline precipitate was filtered, washed with water and dried. The crude 16,17-oxido-5-pregnene-3β-ol-20-one weighed 2.53 g. and melted at 180–186°. One recrystallization from methanol gave 2.0 g. of material melting at 187–190°, which gave no depression on admixture with 16,17-oxido-5-pregnene-3β-ol-20-one prepared by another method.

Example 2

*16,17-oxido-5-pregnene-3β-ol-20-one from 5,16-pregnadiene-3β-ol-20-one.*—5,16 - pregnadiene - 3β - ol - 20-one, M. P. 212–215° C., was treated in much the same manner as described in Example 1 for the corresponding acetate. 3.0 g. of the 3β-hydroxy compound yielded 2.4 g. of recrystallized 16,17-oxido-5-pregnene-3β-ol-20-one melting at 188–190° C.

Example 3

*16,17-oxido-pregnane-3α-ol-11,20-dione from 16-pregnene-3α-ol-11,20-dione acetate.*—A solution of 8.0 g. of 16-pregnene-3α-ol-11,20-dione acetate in 400 cc. of methanol was cooled to 10° C. and treated with 16 cc. of 4 N. sodium hydroxide solution and 32 cc. of 30% hydrogen peroxide. The mixture was promptly cooled, and after forty hours at 2° C., the solution was filtered and concentrated in vacuo with little heating to half-volume. Water was added portionwise until one liter of crystallizing solution was obtained. The crystals were filtered, washed three times with distilled water and dried yielding 6.8 g. of the oxide of melting point 217–219° C. For analyses, a sample was recrystallized from acetone, which gave white plates, M. P. 220° C.

*Analysis.*—Calcd. for $C_{21}H_{30}O_4$: C, 72.79; H, 8.70. Found: C, 72.55; H, 8.59.

Acetylation with acetic anhydride in pyridine at room temperature for ten hours gave 16,17-oxidopregnane-3α-ol-11,20-dione acetate, M. P. 133° C.

Example 4

*Preparation of 9(11),16-pregnadiene-3α-11-diol-20-one 3,11-diacetate.*—A solution of 10.0 g. of pregnane-3α-ol-11,20-dione acetate in 450 cc. of acetic anhydride containing 5.0 g. of p-toluene-sulfonic acid monohydrate was slowly distilled for a period of twelve hours. During this period, 355 cc. of distillate was collected. The dark residual solution was carefully decomposed with water and extracted with ether. The ethereal solution was washed with water, 2% aqueous sodium hydroxide solution and then with water till free of alkali. The dried solution was concentrated in vacuo to a tan, crystalline mass. This was taken up in alcohol-free ether and poured over a column of 60 g. of activated alumina. The desired product was eluted with about 800 cc. of ether. Concentration of the ether eluate and dilution with petroleum ether (B. P. 35–60°) gave 5.0 g. of 9(11),17(20)-pregnadiene-3α,11,20-triol 3,11-20-triacetate, M. P. 192–198° C. The material contained in the mother liquor proved suitable for recycling.

The 9(11),17(20)-pregnadiene-3α,11,20-triol 3,11,20-triacetate (3.0 g.) was dissolved in 50 cc. of acetic acid and treated with 8.42 cc. of a solution of bromine in acetic acid (contains 1.05 g. $Br_2$). After complete decolorization, the product was precipitated with water, filtered and dried. There was obtained 3.1 g. of 17-bromo-9(11)-pregnene-3α,11-diol-20-one 3,11-diacetate.

The 17-bromo compound was dissolved in 15 cc. of collidine and refluxed for two hours. The mixture was then diluted with ether, and the ethereal mixture washed with water, dilute hydrochloric acid, and water. After treatment of the ether solution with charcoal and separation of the latter, the solution was concentrated. The residual material gave upon crystallization of acetone-petroleum ether (B. P. 35–60°), 1.17 g. of material melting at 174–180° C. One recrystallization raised the melting point of the 9(11),16,-pregnadiene-3α,11,diol-20-one 3,11-diacetate to 180–182° C.

Example 5

*16,17 - oxido-pregnane - 3α - ol - 11,20 - dione from 9(11),16 - pregnadiene - 3α,11 - diol - 20-one, 3,11-diacetate.*—A solution of 1.0 g. of 9(11),16-pregnadiene-3α,11-diol-20-one 3,11-diacetate in 75 cc. of methanol was treated with 2 cc. of 4 N. sodium hydroxide solution and 4 cc. of 30% hydrogen peroxide solution. This solution was allowed to stand for 40 hours at 2° C. It was then concentrated in vacuo to about 25 cc. and diluted with two volumes of water. After chilling the plate-like crystals were separated, washed with water and dried. The dried 16,17 - oxydopregnane - 3α - ol - 11,20 - dione weighed 710 mg. and melted at 218–220° C.

The foregoing examples show that the alkaline hydrogen peroxide treatment is specific for the conjugated 16-17 unsaturated linkage of the conjugated $\Delta^{16}$-20-keto structure, leaving any isolated points of unsaturation untouched. Thus, neither carbonyl, enol nor carbon-carbon double bond structures were attacked. Thus by the process compounds also containing non-conjugated carbonyl groups may be treated without lactone or ester formation involving such carbonyl groups. Similarly it is not necessary to protect isolated carbon-carbon double bonds by separate procedures against epoxide formation.

It will be apparent that various modifications may be made in the procedure to be employed. Thus free alcohols instead of esters may be employed. Other esters than the acetate may also be used without departing from the invention. Thus propionates, butyrates, benzoates, etc. may be employed in practicing the invention.

It has been previously pointed out that while prior work indicates that 11-keto and 12-keto steroids are resistant to lactone formation on treatment with perbenzoic acid, our experience has been to the contrary. Also, Karrer, Organic Chemistry, Eng. Ed. (1938), page 630, states that cyclic ketones on treatment with hydrogen peroxide are oxidized to lactones. Moreover, Fieser and Fieser, Natural Products Related to Phenanthrene, 3rd ed. (1949), on page 220, show that when cholesterol is treated with acid hydrogen peroxide, a vicinal glycol is formed. Fieser and Fieser also state on page 227 that the α,β-unsaturated ketones are not easily hydroxylated by the usual reagents: perbenzoic acid, hydrogen peroxide or osmium tetroxide. It is thus seen that the instant invention provides a distinctly novel and unpredictable procedure for the preferential epoxidation of $\Delta^{16}$-20-keto-pregnenes also possessing non-conjugated unsaturation elsewhere in the steroid molecule.

Reference is made herein to Serial No. 109,808, filed August 11, 1949, describing and claiming the 16,17-oxido-20-keto-5-pregnenes disclosed herein.

Having described the invention, what is claimed is:
16,17-oxido-pregnane-3α-ol-11,20-dione.

No references cited.